(12) United States Patent
Haga et al.

(10) Patent No.: US 7,425,793 B2
(45) Date of Patent: Sep. 16, 2008

(54) LAMP COOLING DEVICE AND PROJECTION DISPLAY APPARATUS

(75) Inventors: Motohisa Haga, Kanagawa (JP); Kei Yamaoka, Kanagawa (JP); Kazuya Terasaki, Gifu (JP); Yukio Ito, Aichi (JP); Takuji Ohkubo, Chiba (JP); Hiroshi Hasegawa, Tokyo (JP); Katsuhiro Yamashita, Tokyo (JP); Masataka Oonishi, Tokyo (JP); Dai Yoneya, Tokyo (JP); Satoru Miwa, Aichi (JP); Shigeyasu Nakagawa, Aichi (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 11/385,057

(22) Filed: Mar. 21, 2006

(65) Prior Publication Data

US 2006/0232973 A1   Oct. 19, 2006

(30) Foreign Application Priority Data

Mar. 24, 2005   (JP)   ............................. 2005-086346

(51) Int. Cl.
*H01J 1/02* (2006.01)

(52) U.S. Cl. .......................................... 313/46; 313/25
(58) Field of Classification Search .................. 313/25, 313/36, 44, 46
See application file for complete search history.

(56) References Cited

U.S. PATENT DOCUMENTS 3,686,528 A * 8/1972 Sheets .................... 315/111.21

\* cited by examiner

*Primary Examiner*—Vip Patel
(74) *Attorney, Agent, or Firm*—Frommer Lawrence & Haug LLP; William S. Frommer

(57) ABSTRACT

Disclosed herein is a lamp cooling device for cooling a lamp including a light emission source for emitting light, a front transparent plate, a reflector for reflecting light emitted by the light emission source toward the front transparent plate, the light emission source being disposed in an intralamp space surrounded by the front transparent plate and the reflector, said lamp cooling device including: a duct having joint ports defined in respective opposite ends thereof and communicating with said intralamp space, said duct having a continuously extending portion between said opposite ends which is disposed in a space outside of said intralamp space, for circulating a gas through said duct and said intralamp space in isolated relation to the space outside of said intralamp space.

13 Claims, 17 Drawing Sheets

LAMP COOLING DEVICE AND PROJECTION DISPLAY APPARATUS

CROSS REFERENCES TO RELATED APPLICATIONS

The present invention contains subject matter related to Japanese Patent Application 2005-086346 filed with the Japanese Patent Office on Mar. 24, 2005, the entire contents of which being incorporated herein by reference.

BACKGROUND OF THE INVENTION

The present invention relates to a lamp cooling device for cooling a lamp for use as a light source for projection display apparatus, and a projection display apparatus, and more particularly to a lamp cooling device for directly air-cooling an intralamp space surrounded by a reflector and a front transparent plate, and a projection display apparatus.

FIGS. 20 and 21 of the accompanying drawings show a structure of a general lamp 1 for use as a light source for projection display apparatus. The lamp 1 has a light emission source 3a including a glass tube filled with a discharge gas. The light emission source 3a is positioned in a space surrounded and sealed from the exterior by a reflector 2 and a front transparent plate 5. Light emitted from the light emission source 3a is reflected toward the front transparent plate 5 side by a reflecting surface as an inner surface of the reflector 2, and passes through the front transparent plate 5 out of the lamp 1. The light emitted from the lamp 1 is mainly composed of parallel rays of light as indicated by the solid-line arrows in FIG. 21. However, the light emitted from the lamp 1 may be converged or diverged as indicated by the broken-line arrows in FIG. 21.

The light emission source 3a radiates not only light, but also a large amount of heat. From the standpoint of better light emission efficiency and longer service life, the temperature Tb of the light emission source 3a (burner) and the temperature Tc of a sealed portion 3b of the bulb tip end need to fall in a predetermined temperature range. As shown in FIG. 20, it has been customary to cool the lamp 1 with cold air that is applied to the rear end of the lamp 1 by a fan 51.

To meet recent requirements for higher lamp luminance, the amount of heat to be discharged from the lamp is growing, making it difficult to keep the temperatures Tb, Tc within the predetermined temperature range simply by applying cold air to the lamp 1 as shown in FIG. 20. The temperatures Tb, Tc may be kept within the predetermined temperature range by increasing the rotational speed of the fan 51 or employing a larger fan. However, these proposals may possibly tend to produce air flow noise at a level not permissible for projection display apparatus, and greatly reduce the commercial value of projection display apparatus.

There has been proposed a structure as shown in FIG. 22 of the accompanying drawings wherein openings 52, 53 are defined respectively in lower and upper surfaces of a reflector 2 and the space in a lamp 1 is ventilated through the openings 52, 53 for thereby directly air-cooling a light emission source 3a and a sealed portion 3b of the bulb tip end. For details, reference should be made to Japanese Patent Laid-Open No. 10-186513 (FIG. 6B), for example.

SUMMARY OF THE INVENTION

However, introducing ambient air into the space in the lamp 1 in which the light emission source 3a and the sealed portion 3b of the bulb tip end are located poses the following problems, such as dust and dirt contained in the ambient air enter the space in the lamp 1, blocking light thereby to reduce the amount of light emitted from the lamp, i.e., to reduce the luminance of the lamp 1. Moreover, air as it flows through the openings or air inlet/output ports 52, 53 tends to cause noise. When the service life of the lamp 1 ends and the light emission source 3a is ruptured, the rupture sounds and fragments of the light emission source 3a are discharged out of the lamp 1.

It is desirable to provide a lamp cooling device which produces low noise and is highly reliable in operation, and a projection display apparatus incorporating such a lamp cooling device.

A lamp cooling device for cooling a lamp according to the present invention has a duct having joint ports defined in respective opposite ends thereof and communicating with an intralamp space of the lamp. The duct has a continuously extending portion between the opposite ends which is disposed in a space outside of the intralamp space, for circulating a gas through the duct and the intralamp space in isolated relation to the space outside of the intralamp space.

A projector display apparatus according to the present invention has a lamp and a lamp cooling device for cooling the lamp. The lamp cooling device has a duct having joint ports defined in respective opposite ends thereof and communicating with an intralamp space of the lamp. The duct has a continuously extending portion between the opposite ends which is disposed in a space outside of the intralamp space, for circulating a gas through the duct and the intralamp space in isolated relation to the space outside of the intralamp space.

When the lamp is energized and light is emitted from the light emission source, the temperature of the gas, i.e., air, in the intralamp space increases. Because of a natural convection of the gas, there is developed a temperature difference in the intralamp space between a higher temperature in an upper region (away from the gravitational direction) of the intralamp space and a lower temperature in a lower region (toward the gravitational direction) of the intralamp space. The higher-temperature gas flows into the duct at a lower temperature. While flowing through the duct, the gas is cooled by a heat exchange with air outside of the duct, and then flows back from the duct into the intralamp space.

The gas cooled while flowing through the duct and flowing back into the intralamp space is lower in temperature than the gas flowing out of the intralamp space, and cools the light emission source. Having cooled the light emission source, the gas becomes higher again in temperature and flows again into the duct. While flowing through the duct, the gas is cooled again and flows back into the intralamp space. Therefore, the gas is circulated through the duct and the intralamp space. As a result, the light emission source is controlled into a desired temperature range, thereby increasing the service life of the lamp and allowing the lamp to emit a desired amount of light continuously.

When directly cooling the light emission source in the intralamp space, the cooling gas is isolated from the space outside of the lamp. Stated otherwise, the gas in the intralamp space and the gas outside of the lamp are not exchanged themselves, but only a heat exchange occurs between the gas in the intralamp space and the gas outside of the lamp.

With this structure, no dust and dirt particles enter from outside of the lamp into the intralamp space, and block light emitted from the light emission source and hence reduce the luminance of the lamp. Even if gas flow noise occurs when the gas flows into the intralamp space through the gas inlet and also from the intralamp space through the gas outlet, and if rupture sounds are produced when the light emission tube is ruptured, since the gas flow noise and the rupture sounds are generated within a duct assembly isolated from the external space, those noise and sounds are prevented from leaking out. As a consequence, undesirable noise of the projection display apparatus is greatly reduced. Fragments of the ruptured light emission tube and a harmful material, e.g., mercury if the lamp is a mercury lamp, are also prevented from being discharged out.

According to the present invention, the gas in the intralamp space is circulated through the duct in isolated relation to the space outside of the lamp, and is directly introduced into the intralamp space to cool the light emission source. Therefore, no foreign matter enters the intralamp space from outside of the lamp, and no noise leaks from the intralamp space into the space outside of the lamp. As a result, the lamp is effectively cooled without damage to its quality for achieving an increased service life.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

First Embodiment

Figure 1:
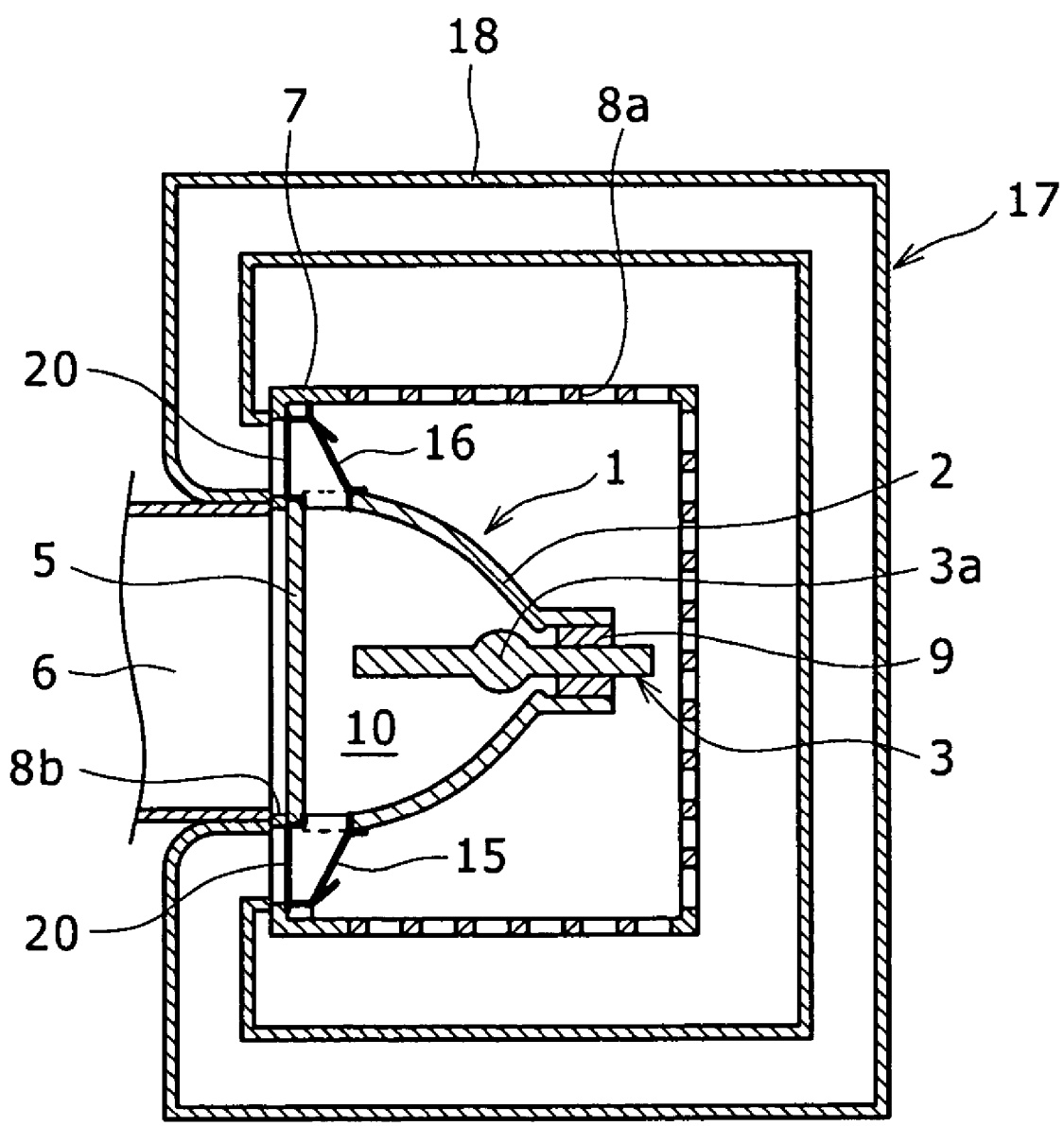
FIG. 1 is a cross-sectional view of a lamp and a lamp cooling device according to a first embodiment of the present invention.
Figure 2:
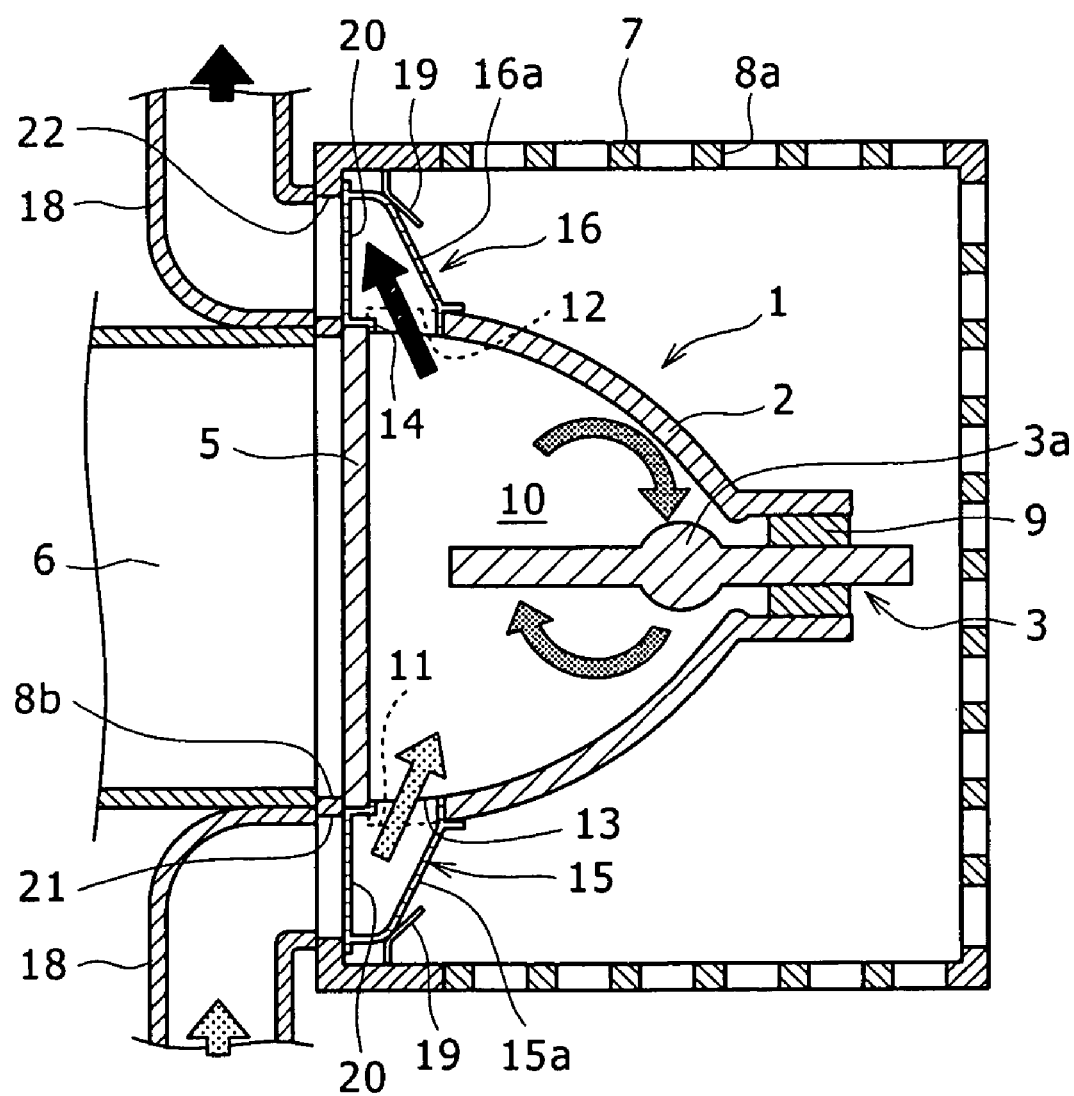
FIG. 2 is an enlarged fragmentary cross-sectional view of the lamp and the lamp cooling device shown in FIG. 1.

FIG. 1 shows in cross section a lamp cooling device and a lamp according to a first embodiment of the present invention, and FIG. 2 shows in enlarged fragmentary cross section the lamp cooling device shown in FIG. 1. The lamp cooling device according to the first embodiment as shown in FIGS. 1 and 2 is incorporated in a projection display apparatus which has an optical unit 6 for processing rays of light emitted from a lamp 1 and an image produced by the optical unit 6 is projected at an enlarged scale onto a projection surface by a projection lens. The projection display apparatus may be a projector for projecting images onto the front surface of a screen, a rear projection television set having a projector for projecting images onto the rear surface of a screen, or the like. The optical unit 6 has a liquid crystal display unit or a DMD (Digital Micromirror Device) for generating images.

The lamp 1 may include a metal halide lamp, a high-pressure mercury lamp, a halogen lamp, a xenon lamp, or the like wherein a light emission tube 3 is filled with a metal gas and an electric discharge is caused between electrodes.

The light emission tube 3 has a light emission source 3a where the tip ends of the electrodes are disposed in facing relation to each other for producing an electric discharge therebetween, and a cup-shaped reflector 2 surrounding the light emission source 3a. The reflector 2 includes an elliptical mirror or a paraboloidal mirror having a light reflecting film deposited on a heat-resistant and ultraviolet-ray-resistant glass member. The reflector 2 serves to efficiently collect light emitted by the light emission source 3a and guide the collected light to a front transparent plate 5 and an optical unit 6.

The front transparent plate 5 is made of transparent heat-resistant glass or synthetic resin, and closes a front opening of the reflector 2. The reflector 2 has a tubular rear end from which an end of the light emission tube 3 extends out of the reflector 2. The gap between the end of the light emission tube 3 and the tubular rear end of the reflector 2 is filled with a sealing member 9 made of a heat-resistant material, e.g., a ceramic material. The reflector 2, the sealing member 9, and the front transparent plate 5 surround an intralamp space 10 in which the light emission source 3a is positioned closely to the tubular rear end of the reflector 2, i.e., the neck of the reflector 2.

The reflector 2 has a gas outlet 12 defined through an upper wall thereof near the upper end of the front transparent plate 5. The gas outlet 12 is located in facing relation to a region of the intralamp space 10 which is made higher in temperature than other regions of the intralamp space 10 by a natural convection of a gas in the intralamp space 10 while the lamp 1 is in operation. The reflector 2 also has a gas inlet 11 defined through a lower wall thereof near the lower end of the front transparent plate 5 in diametrically opposite relation to the gas outlet 12. The gas inlet 11 is located in facing relation to a region of the intralamp space 10 which is made lower in temperature than other regions of the intralamp space 10 by a temperature difference of the gas due to a natural convection of the gas in the intralamp space 10 while the lamp 1 is in operation. The gas inlet 11 and the gas outlet 12 are not limited to the illustrated positions, but may be defined in other regions of the reflector 2, or may be defined in the front transparent plate 5.

The lamp 1 thus constructed is disposed in a lamp case 7. The lamp case 7 has a central opening 8b defined in a front wall thereof between the front transparent plate 5 and the optical unit 6, for allowing light emitted from the light emission source 3a and passing through the front transparent plate 5 and light reflected by the inner surface of the reflector 2 to travel to the optical unit 6.

The lamp case 7 also has an upper opening 22 defined in the front wall thereof above the central opening 8b and a lower opening 21 defined in the front wall thereof below the central opening 8b. The upper opening 22 and the gas outlet 12 are angularly spaced from each other by 90°. The lower opening 21 and the gas inlet 11 are angularly spaced from each other by 90°. The lamp case 7 also has a plurality of openings 8a defined in an upper wall, a rear wall, and a lower wall thereof.

The gas inlet 11 of the lamp 1 and the lower opening 21 of the lamp case 7 are interconnected by an inlet duct 15. The inlet duct 15 has an end inserted in the gas inlet 11 and having a joint port 13 which communicates with the intralamp space 10 through the gas inlet 11. The other end of the inlet duct 15 has a joint port communicating with the joint port 13 through a passage defined in the inlet duct 15 and facing the lower opening 21 of the lamp case 7.

The inlet duct 15 has an outer wall 15a serving as a structure for controlling a circulative gas flow directed from the joint port 13 of the inlet duct 15 into the intralamp space 10. The outer wall 15a includes a portion inclined toward the light emission source 3a from a straight line interconnecting the gas inlet 11 and the gas outlet 12.

A duct holder leaf spring 19 is disposed between the inlet duct 15 and the lower wall of the lamp case 7 and has an end mounted on the lower wall of the lamp case 7. The duct holder leaf spring 19 is pressed against a curved portion of the outer wall 15a of the inlet duct 15, which interconnects a portion of the inlet duct 15 positioned closer to the lower opening 21 and extending parallel to the lower wall of the lamp case 7 and the inclined portion of the inlet duct 15 which extends parallel to the direction in which a gas flows through the inlet duct 15 into the intralamp space 10. The duct holder leaf spring 19 thus pressed holds the end of the inlet duct 15 against the lower end of the front transparent plate 5 and the peripheral edge of the gas inlet 11, and also holds the other end of the inlet duct 15 against the peripheral edge of the lower opening 21 of the lamp case 7. In this manner, the joint between the inlet duct 15 and the gas inlet 11 and also the joint between the inlet duct 15 and the lower opening 21 of the lamp case 7 are free of gaps, hermetically sealing the intralamp space 10.

A mesh plate 20, which may be a metal mesh plate, for example, is interposed between the lower opening 21 of the lamp case 7 and the joint port of the inlet duct 15 which faces the lower opening 21.

The gas outlet 12 of the lamp 1 and the upper opening 22 of the lamp case 7 are interconnected by an outlet duct 16. The outlet duct 16 has an end inserted in the gas outlet 16 and having a joint port 14 which communicates with the intralamp space 10 through the gas outlet 12. The other end of the outlet duct 16 has a joint port communicating with the joint port 14 through a passage defined in the outlet duct 16 and facing the upper opening 22 of the lamp case 7.

The outlet duct 16 has an outer wall 16a serving as a structure for controlling a circulative gas flow directed from the joint port 14 of the outlet duct 16 into the intralamp space 10. The outer wall 16a includes an inclined portion for smoothly guiding the gas flowing from the gas outlet 12 toward the upper opening 22 of the lamp case 7.

Another duct holder leaf spring 19 is disposed between the outlet duct 16 and the upper wall of the lamp case 7 and has an end mounted on the upper wall of the lamp case 7. The duct holder leaf spring 19 is pressed against a curved portion of the outer wall 16a of the outlet duct 16, which interconnects a portion of the outlet duct 16 positioned closer to the upper opening 22 and extending parallel to the upper wall of the lamp case 7 and the inclined portion of the outlet duct 16 which extends parallel to the direction in which the gas flows from the intralamp space 10 into the outlet duct 16. The duct holder leaf spring 19 thus pressed holds the end of the outlet duct 16 against the upper end of the front transparent plate 5 and the peripheral edge of the gas outlet 12, and also holds the other end of the outlet duct 16 against the peripheral edge of the upper opening 22 of the lamp case 7. In this manner, the joint between the outlet duct 16 and the gas outlet 12 and also the joint between the outlet duct 16 and the upper opening 22 of the lamp case 7 are free of gaps, hermetically sealing the intralamp space 10.

Another mesh plate 20, which may be a metal mesh plate, for example, is interposed between the upper opening 22 of the lamp case 7 and the joint port of the outlet duct 16 which faces the upper opening 22.

A duct 18 is disposed outside of the lamp case 7 and has an end joined to the lower opening 21 and another end joined to the upper opening 22. The peripheral edge of the lower opening 21 and the peripheral edge of the end of the duct 18 are held in mating relation to each other with a hermetic seal, e.g., a rubber O-ring, interposed therebetween. Similarly, the peripheral edge of the upper opening 22 and the peripheral edge of the other end of the duct 18 are held in mating relation to each other with a hermetic seal, e.g., a rubber O-ring, interposed therebetween.

The duct 18 has a continuously extending portion from the end thereof joined to the lower opening 21 to the other end thereof joined to the upper opening 22, and is disposed around the lamp case 7, i.e., is disposed in a space outside of the lamp case 7. The duct 18 and the inlet and outlet ducts 15, 16 which are disposed in the lamp case 7 jointly make up a duct assembly 17 for circulating the gas through the intralamp space 10 in isolated relation to the space outside of the lamp 1. The passage defined in the duct assembly 17 communicates with the intralamp space 10 through the joint port 13 of the inlet duct 15 at one end of the duct assembly 17, the gas inlet 11 defined in the reflector 2 of the lamp 1, the joint port 14 of the outlet duct 16 at the other end of the duct assembly 17, and the gas outlet 12 defined in the reflector 2 of the lamp 1.

As described above, the joint between the inlet duct 15 and the gas inlet 11, the joint between the inlet duct 15 and the lower opening 21, the joint between the outlet duct 16 and the gas outlet 12, and the joint between the outlet duct 16 and the upper opening 22 are hermetically sealed under the resilient forces of the duct holder leaf springs 19, and the lower and upper openings 21, 22 and the opposite ends of the duct 18 are hermetically sealed by the hermetic seals. Therefore, the intralamp space 10 and the spaces in the ducts 15, 16, 18 are closed from the space outside of the lamp 1, i.e., the space inside the housing of the projection display apparatus, and the atmospheric space outside of the housing of the projection display apparatus.

Figure 3:
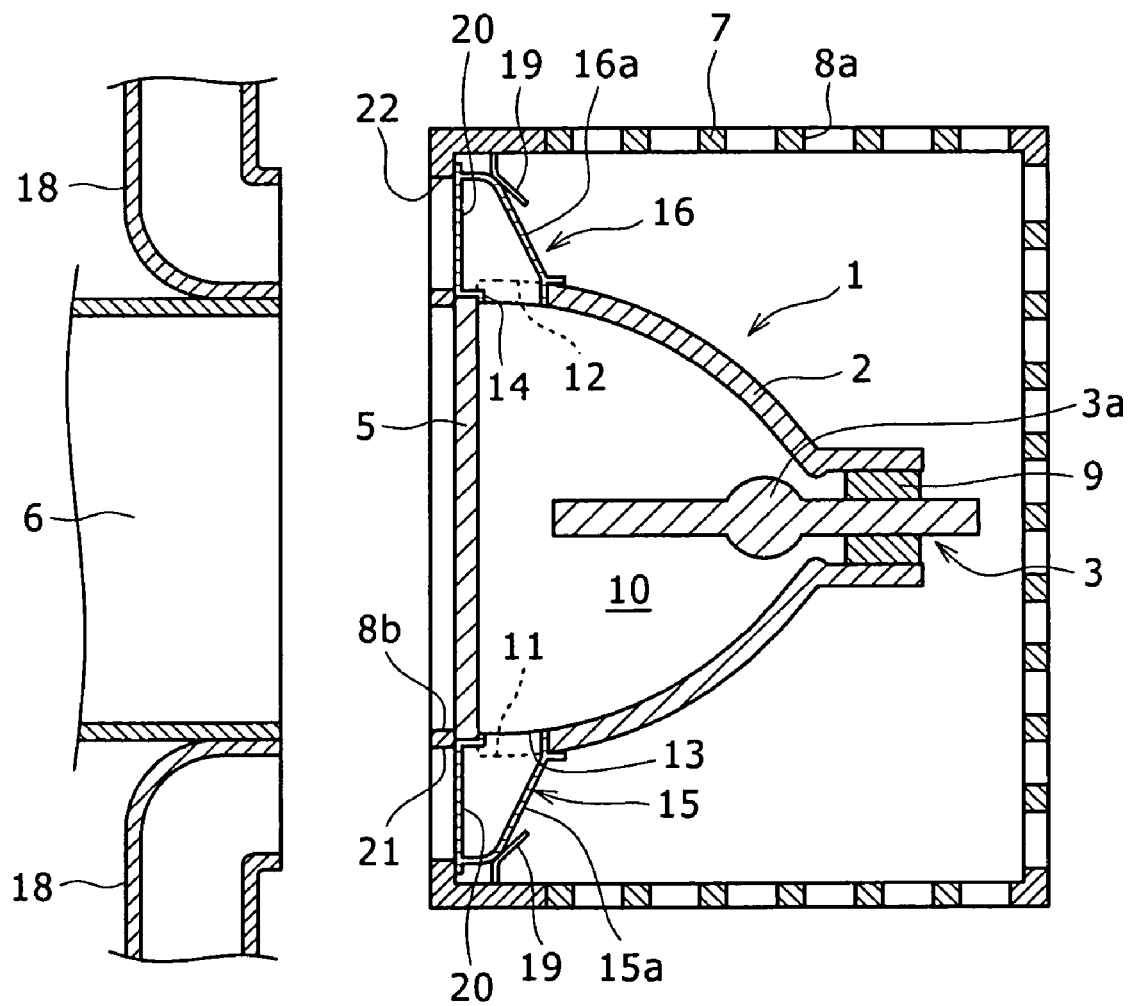
FIG. 3 is an enlarged fragmentary cross-sectional view of the lamp cooling device, showing the manner in which a lamp and a lamp case are separated from a duct.

The lamp 1 is an expendable product and has to be replaced with a new one when its service life is finished. According to the present embodiment, as shown in FIG. 3, the lamp 1, the lamp case 7, the inlet duct 15, and the outlet duct 16 are separable from the opposite ends of the duct 18. Since the lower opening 21 and the upper opening 22 of the lamp case 7 are oriented in the same direction, the lamp case 7 can easily be detached from or connected to the duct 18 when the lamp case 7 is moved in one direction or the other, i.e., in the leftward or rightward direction in FIG. 3.

Operation of the lamp cooling device to cool the lamp 1 will be described below.

When the lamp 1 is energized and light is emitted from the light emission source 3a, the temperature of the gas, i.e., air, in the intralamp space 10 increases. Because of a natural convection of the gas, there is developed a temperature difference in the intralamp space 10 between a higher temperature in an upper region of the intralamp space 10 and a lower temperature in a lower region of the intralamp space 10, forming an upward gas flow from the lower region to the upper region.

The high-temperature gas flows through the gas outlet 12 defined through the upper wall of the reflector 2 into the outlet duct 16, and then flows along the inclined portion of the outer wall 16a of the outlet duct 16 into the upper opening 22, from which the gas is introduced into the duct 18. While the gas is flowing through the duct 18, the gas is cooled by a heat exchange with the air outside of the duct 18. Then, the cooled gas flows through the lower opening 21 into the inlet duct 15 and then through the gas inlet 11 defined through the lower wall of the reflector 2 into the intralamp space 10. At this time, the gas flows along the inclined portion of the outer wall 15a of the inlet duct 15 and enters the intralamp space 10 toward the light emission source 3a.

Since the gas introduced from the gas inlet 11 into the intralamp space 10 has been cooled, while flowing through the duct 18, to a temperature lower than the gas discharged from the gas outlet 12, the light emission tube 3 including the light emission source 3a is cooled by the gas. The gas is then heated by the heat radiated from the light emission tube 3 including the light emission source 3a, and flows through the gas outlet 12 into the duct 18. While flowing through the duct 18, the gas is cooled again and flows from the gas inlet into the intralamp space 10. Therefore, a circulative gas flow is formed in the intralamp space 10 and the duct assembly 17 including the outlet duct 16, the duct 18, and the inlet duct 15. As a result, the light emission tube 3 including the light emission source 3a is cooled into a desired temperature range, increasing the service life of the lamp 1 and allowing the lamp 1 to emit a desired amount of light continuously. Consequently, the projection display apparatus which employs the lamp 1 has an increased service life and displays images of increased quality.

According to the present embodiment, when the intralamp space 10 and the light emission source 3a are directly cooled by the gas, the cooling gas is isolated from the space outside of the lamp 1, i.e., the space inside the housing of the projection display apparatus, and the atmospheric space outside of the housing of the projection display apparatus. Stated otherwise, the gas in the intralamp space 10 and the gas outside of the lamp 1 are not exchanged themselves, but only a heat exchange occurs between the gas in the intralamp space 10 and the gas outside of the lamp 1.

With this structure, no dust and dirt particles enter from outside of the lamp 1 into the intralamp space 10, and block light emitted from the light emission source 3a and hence reduce the luminance of the lamp 1. Even if gas flow noise occurs when the gas flows into the intralamp space 10 through the gas inlet 11 and also from the intralamp space 10 through the gas outlet 12, and if rupture sounds are produced when the light emission tube 3 is ruptured, since the gas flow noise and the rupture sounds are generated within the duct assembly 17 isolated from the external space, those noise and sounds are prevented from leaking out. As a consequence, undesirable noise of the projection display apparatus is greatly reduced. Fragments of the ruptured light emission tube 3 and a harmful material, e.g., mercury if the lamp 1 is a mercury lamp, are also prevented from being discharged out.

The fragments of the ruptured light emission tube 3 are prevented from flowing from the intralamp space 10 into the duct 18 by the mesh plates 20 between the inlet duct 15 and the lower opening 21 and between the outlet duct 16 and the upper opening 22. Therefore, the duct 18, which may be made of a synthetic resin material, is prevented from being damaged by those fragments and hence its hermetic seal is prevented from being broken. When the lamp 1 is to be replaced with a new one, only the lamp case 7 including the lamp 1 may be replaced without the need for replacing the duct 18, as shown in FIG. 3.

The mesh plates 20 may be disposed in the joint port 13 of the inlet duct 15 and the joint port 14 of the outlet duct 16. However, the mesh plates 20 thus positioned are inclined to the directions in which the gas flows into and out of the intralamp space 10, and may possibly change those directions from desired directions or angles.

In the illustrated embodiment, the mesh plates 20 are interposed between the inlet duct 15 and the lower opening 21 and between the outlet duct 16 and the upper opening 22. The mesh plates 20 thus positioned lie perpendicularly to the directions in which the gas flows into and out of the intralamp space 10, and do not change those directions and do not obstruct the gas as it flows in those directions. Furthermore, the mesh plate 20 that is interposed between the inlet duct 15 and the lower opening 21 is positioned upstream of the outer wall 15a of the inlet duct 15 which controls the direction in which the circulative gas flow enters the intralamp space 10. Therefore, even if the mesh plate 20 disturbs the gas flow in the inlet duct 15, the gas flow is corrected into a desired direction by the outer wall 15a that is located downstream of the mesh plate 20.

Second Embodiment

A lamp cooling device according to a second embodiment of the present invention will be described below with reference to FIG. 4. Those parts of the lamp cooling device according to the second embodiment which are identical to those of the lamp cooling device according to the first embodiment are denoted by identical reference characters, and will not be described in detail below.

Figure 4:
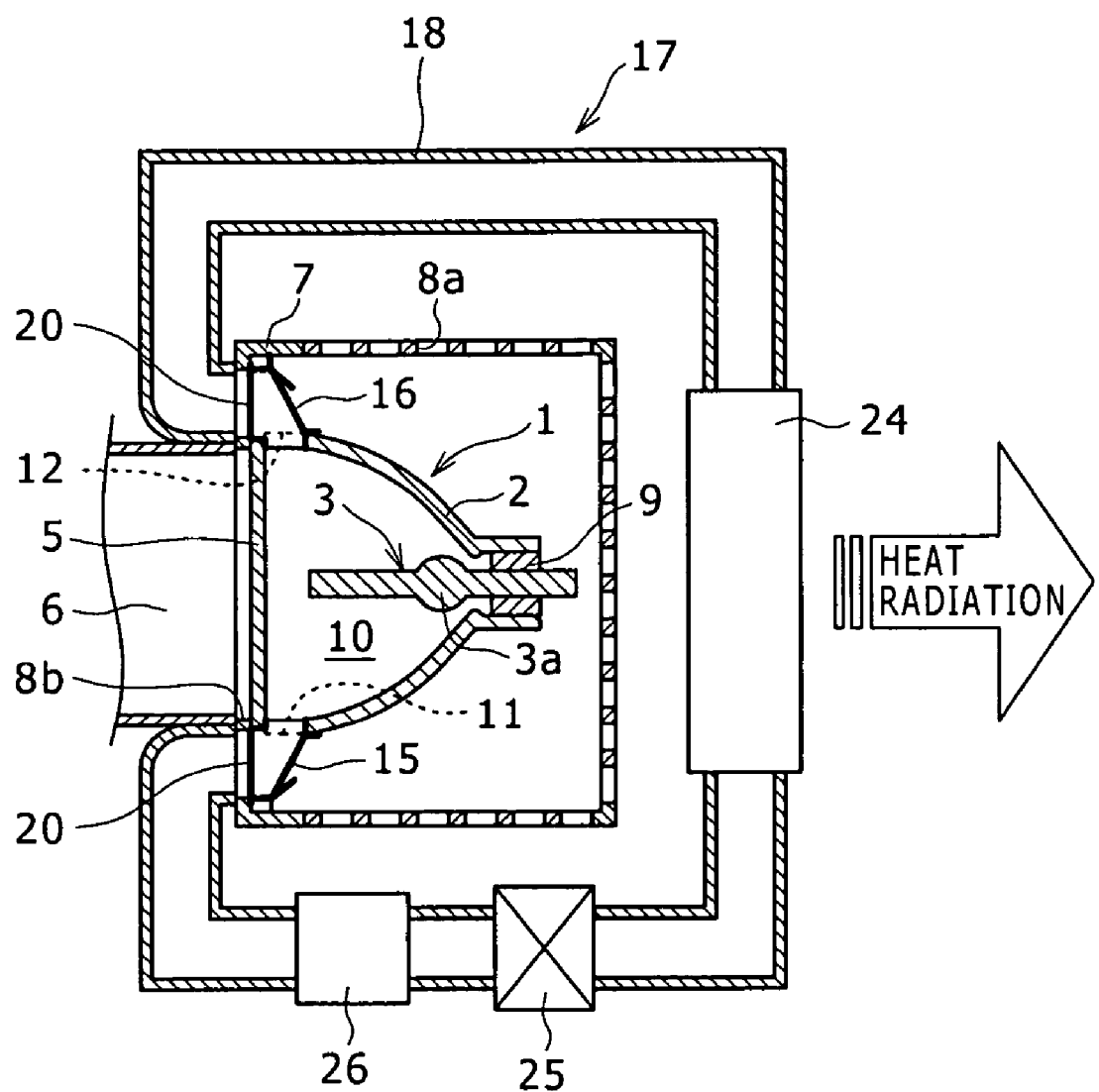
FIG. 4 is a cross-sectional view of a lamp and a lamp cooling device according to a second embodiment of the present invention.

According to the second embodiment, as shown in FIG. 4, the lamp cooling device additionally has a cooling unit 24 disposed in the duct 18 for cooling the gas which is flowing through the duct 18. The cooling unit 24 is located substantially intermediate between the air outlet 12 and the air inlet 11. The cooling unit 24 may include a heat sink of a material having an excellent heat radiating capability, e.g., aluminum or copper, with or without fins, a heat pipe, a heat absorber, a heat exchanger, or the like. The cooling unit 24 is effective to efficiently cool the gas in the duct 18 without being greatly affected by ambient air temperatures.

According to the second embodiment, the lamp cooling device also has an air blower 25 such as a fan or the like disposed in the duct 18 for forcibly circulating the gas through the intralamp space 10 and the duct assembly 17. The air blower 25 increases the speed of the gas flow through the intralamp space 10 and the duct assembly 17 for thereby increasing the efficiency of a heat exchange between the higher-temperature gas and the lower-temperature gas in the intralamp space 10.

The air blower 25 is disposed downstream of the cooling unit 24 in the duct 18. The air blower 25 thus positioned has its motor and impeller protected against damage from the higher-temperature gas flowing through the duct 18.

If the lamp 1 utilizes a mercury lamp, then a mercury trap 26 should preferably be disposed in the duct 18. Even if the light emission source 3a is ruptured for some reasons, e.g., at the end of its service life, and the mercury flows on the gas flow in the duct 18, the mercury trap 26 traps the mercury gas to prevent harmful mercury particles from spreading around. The mercury trap 26 may include a filter of manganese compound, activated carbon, or chelate resin, for example, which traps mercury by reacting with mercury.

Third Embodiment

A lamp cooling device according to a second embodiment of the present invention will be described below with reference to FIG. 5. Those parts of the lamp cooling device according to the third embodiment which are identical to those of the lamp cooling devices according to the first and second embodiments are denoted by identical reference characters, and will not be described in detail below.

Figure 5:
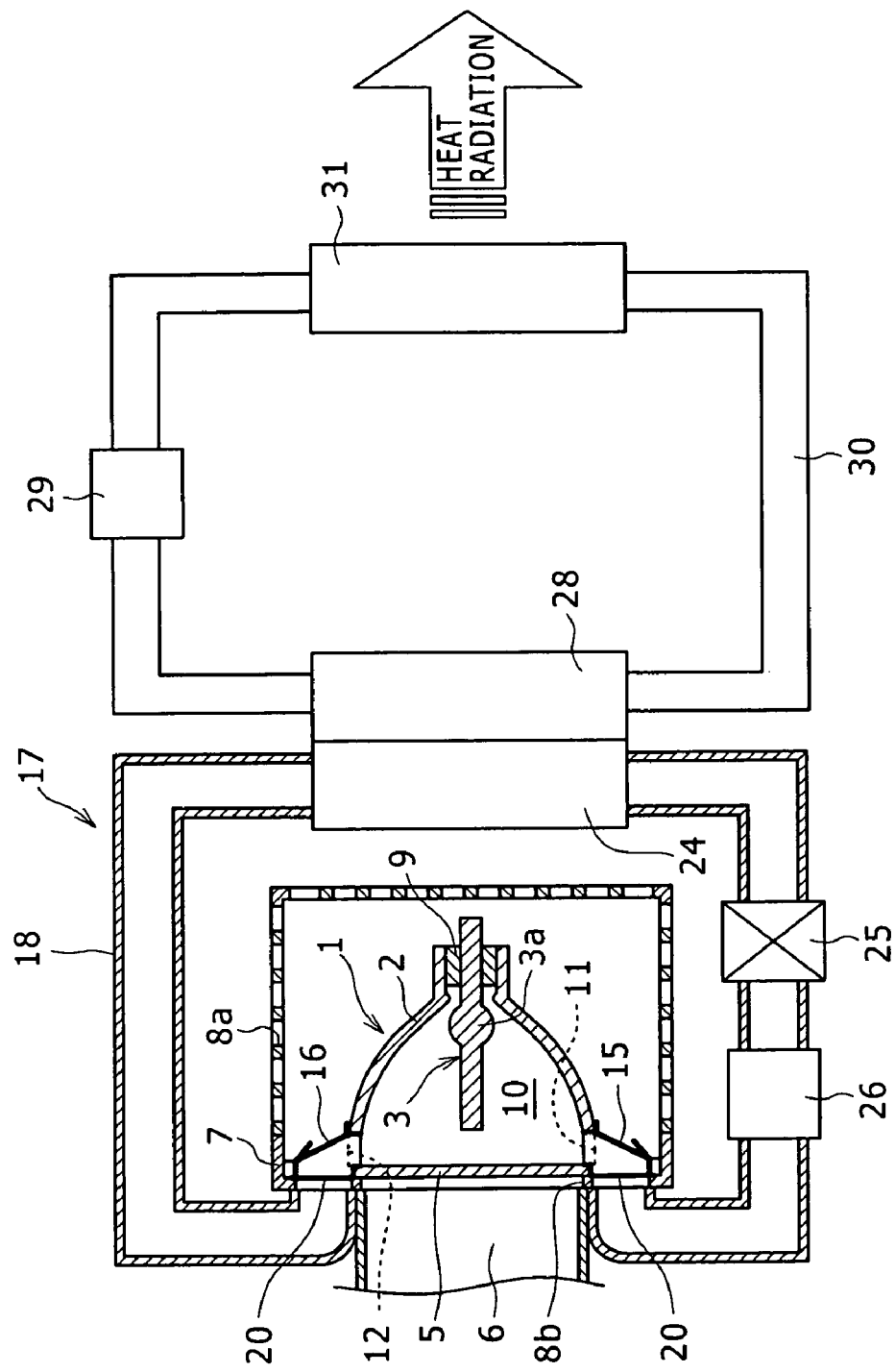
FIG. 5 is a cross-sectional view of a lamp and a lamp cooling device according to a third embodiment of the present invention.

According to the third embodiment, as shown in FIG. 5, the lamp cooling device has a second cooling unit for performing a heat exchange with the cooling unit 24. The second cooling unit includes a liquid-cooling jacket 28, a cooling liquid circulating pipe 30, a cooling liquid circulating pump 29, and a heat radiator 31 such as a heat sink or the like similar to the cooling unit 24. The cooling liquid flowing through the cooling liquid circulating pipe 30 is heated by the cooling unit 24 in the liquid-cooling jacket 28 and flows to the heat radiator 31, which radiates heat from the cooling liquid.

The heat radiated by the heat radiator 31 is dissipated into the ambient air around the housing by a fan or the like. Since the heat is radiated from the cooling liquid by the heat radiator 31, rather than being radiated from the gas by the cooling unit 24, the level of noise produced by the heat radiator 31 is relatively low as the speed of air applied to the heat radiator 31 by the fan is low.

According to the third embodiment, using the cooling liquid, the location where the heat is radiated is shifted from the heating unit 24 to the heat radiator 31. Therefore, by changing the layout of the cooling liquid circulating pipe 30, the location where the heat is radiated can be shifted to a desired position. Consequently, it is possible to increase the freedom of component layouts and designs of the projection display apparatus for thereby reducing the thickness and size of the projection display apparatus. Furthermore, the location where the heat is radiated may be shifted from the heating unit 24, using a heat pipe or the like.

Directions or angles for causing the gas to enter from the gas inlet 11 into the intralamp space 10 will be described below. If the gas enters from the gas inlet 11 into the intralamp space 10 in a direction parallel to a straight line "a" in FIG. 6 interconnecting the center of the gas inlet 11 and the center of the gas outlet 12, the gas is directed straight from the gas inlet 11 to the gas outlet 12, resulting in an insufficient amount of gas applied to the light emission source 3a which is heated to the highest temperature in the lamp 1 and hence failing to sufficiently cool the light emission source 3a. It is preferable to cause the gas to enter from the gas inlet 11 into the intralamp space 10 in a direction "b" that is tilted toward the light emission source 3a from the straight line "a" interconnecting the center of the gas inlet 11 and the center of the gas outlet 12.

FIGS. 9 through 19 are graphs showing temperature changes in various regions of the lamp at the time the angle of the introduced gas, i.e., the direction in which the gas enters the intralamp space, the speed at which the gas flows, and the ambient temperature Ta changed while the temperature of the gas flowing from the gas inlet 11 into the intralamp space 10 was constant (60° C.). The horizontal axis of each of the graphs represents the angle of entry of the introduced gas from a horizontal line "c" passing through the center of the gas inlet 11 shown in FIG. 6, i.e., a straight line normal to the gravitational direction. The angle can be adjusted by adjusting the angle of a duct 35a (see FIG. 6) connected to the gas inlet 11. The vertical axis of each of the graphs represents the temperature.

Figure 6:
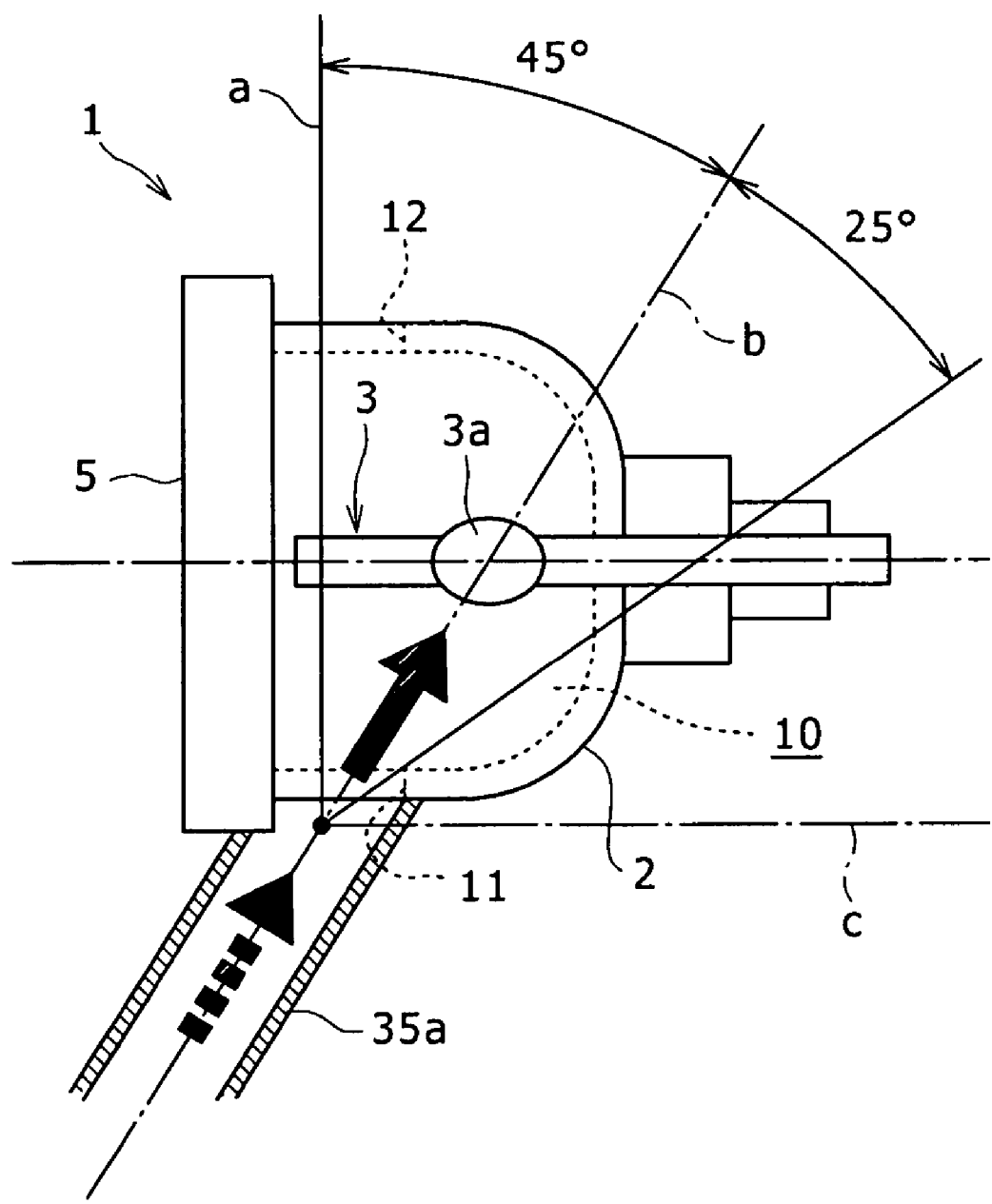
FIG. 6 is a diagram showing an entry angle at which a gas is introduced into an intralamp space.

In each of FIGS. 9 through 19, "Ta−10" indicates that the ambient environmental temperature Ta is Ta=−10° C. Otherwise, Ta=40° C. "INVERTED" means that the gas is introduced from the upper gas outlet 12 into the intralamp space 10, representing that the structure shown in FIG. 6 is inverted, i.e., turned upside down.

Figure 18:
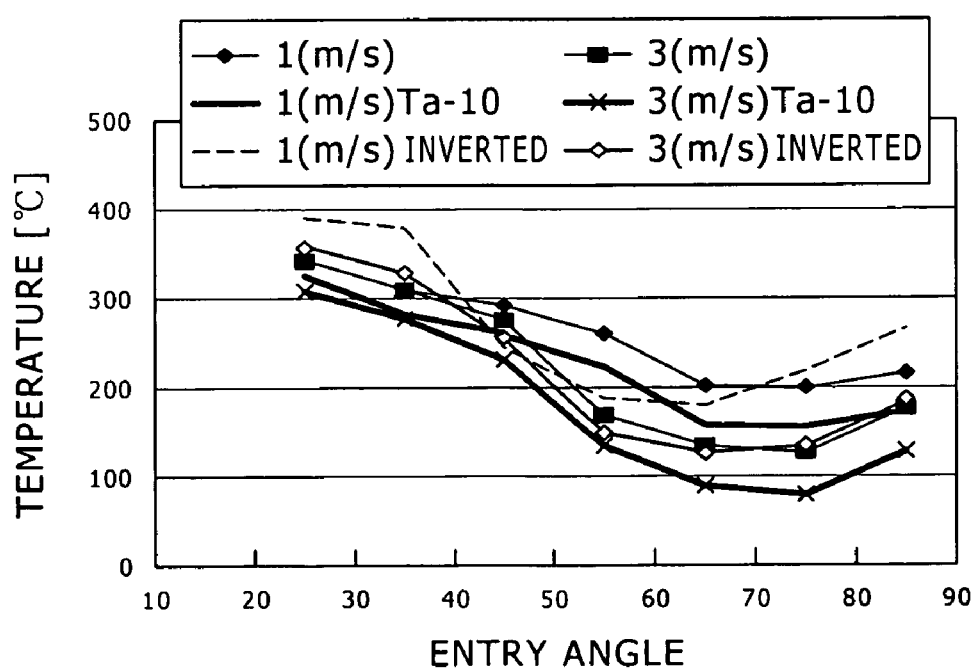
FIG. 18 is a graph showing the relationship between the entry angle and the temperature at a burner tip end.
Figure 19:
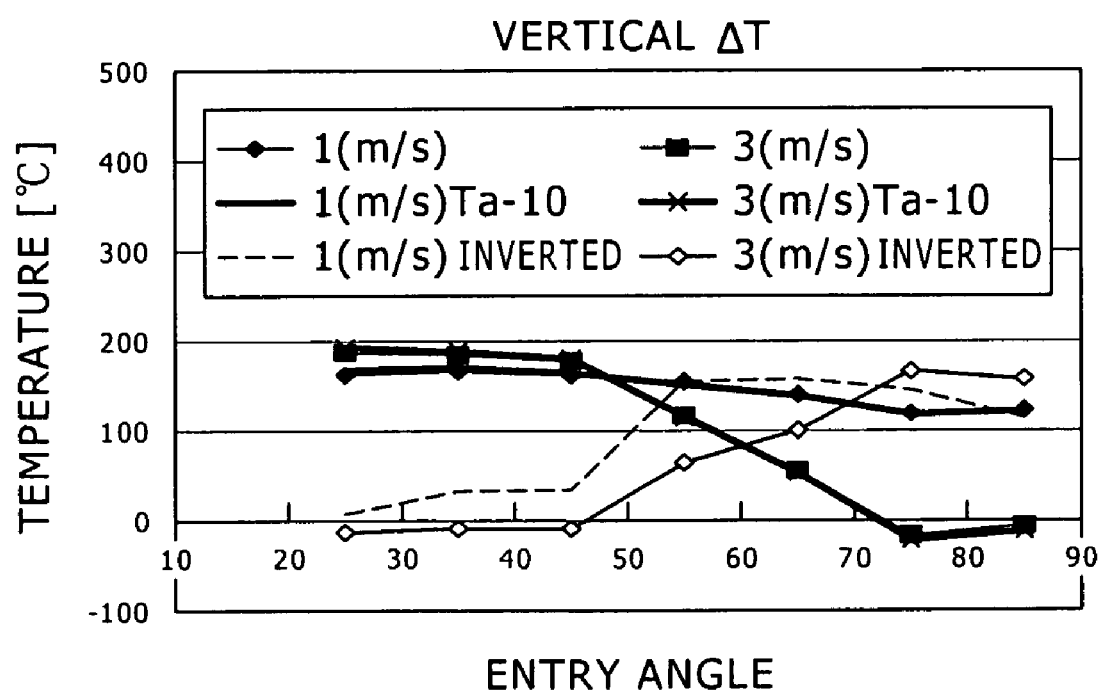
FIG. 19 is a graph showing the relationship between the vertical temperature difference in the intralamp space and the entry angle.
Figure 20:
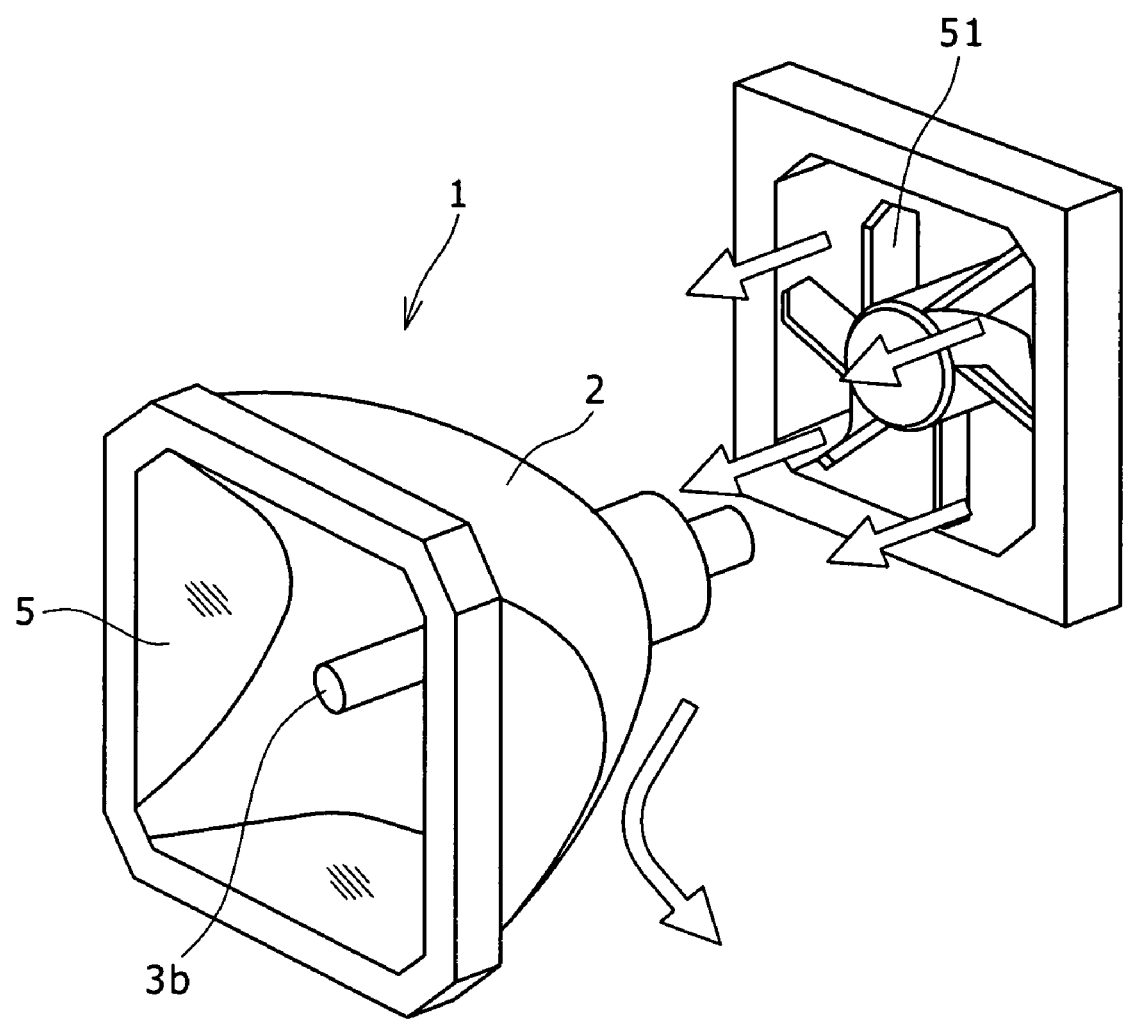
FIG. 20 is a perspective view of a conventional structure for cooling a lamp.
Figure 21:
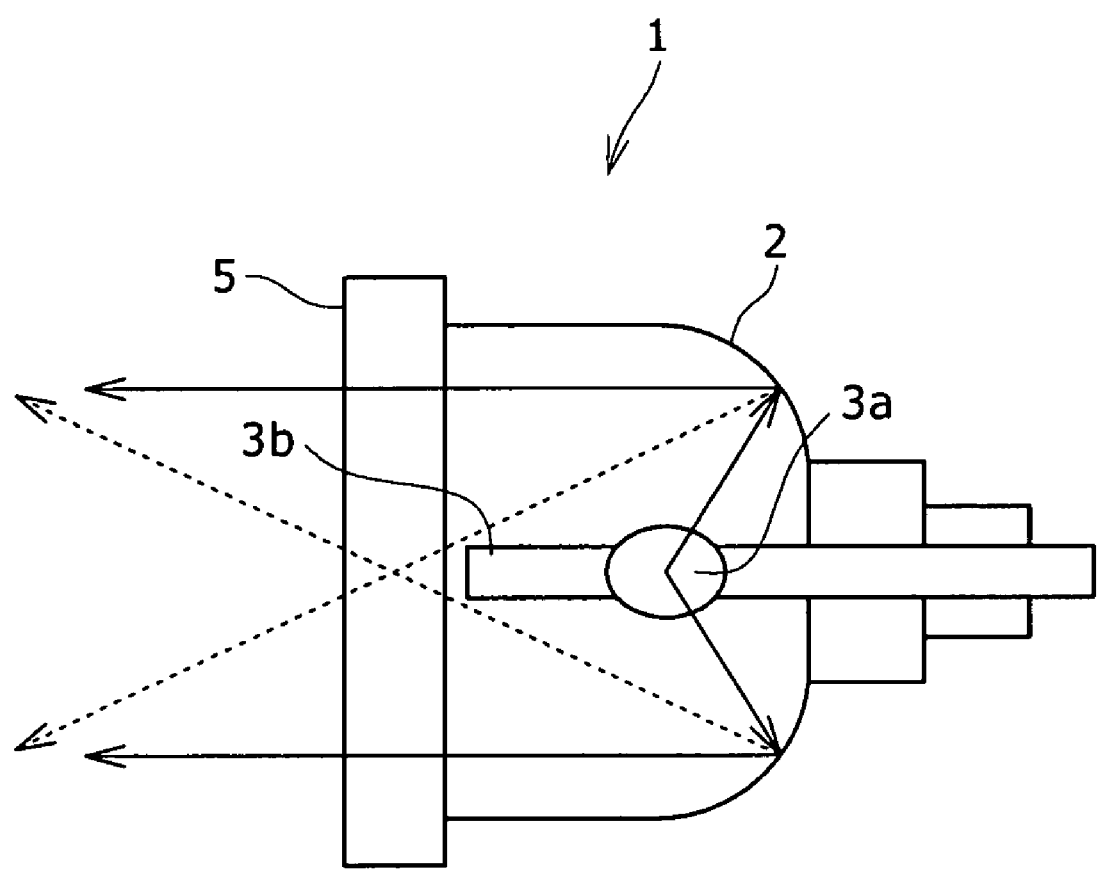
FIG. 21 is a side elevational view of the lamp shown in FIG. 20.
Figure 22:
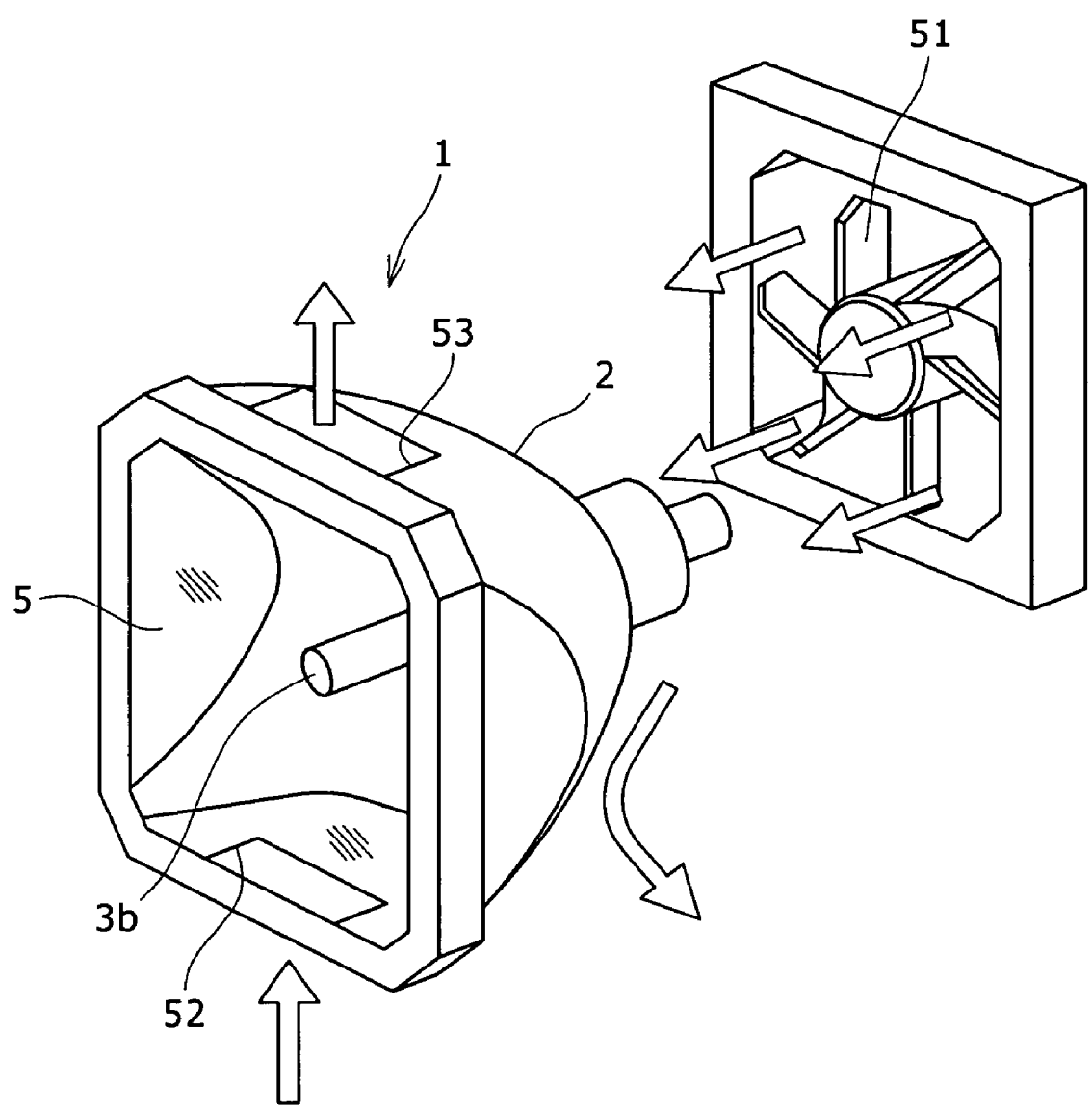
FIG. 22 is a perspective view of another conventional structure for cooling a lamp.

"REFLECTOR ABOVE BULB", "REFLECTOR BELOW BULB", and "REFLECTOR RIGHT OF BULB" represent respective regions in the reflector 2 which correspond to respective positions above, below, and right of the light emission source 3a. "ABOVE NECK" and "BELOW NECK" represent respective positions above and below the base, i.e., the neck, of the reflector 2. "ABOVE BULB" and "BELOW BULB" represent respective positions above and below the light emission source 3a. FIG. 18 shows changes in the temperature Tc at the bulb tip end 3b shown in FIG. 21, and FIG. 19 shows vertical temperature differences in the light emission source 3a.

It can be seen from each of the above graphs that no problems arise under the given conditions if the entry angle falls in an angle range of 45° from the straight line "b" interconnecting the center of the gas inlet 11 and the center of the light emission source 3a toward a light emission direction (counterclockwise) and in an angle range of 25° from the straight line "b" away from the light emission direction (clockwise).

Figure 7:
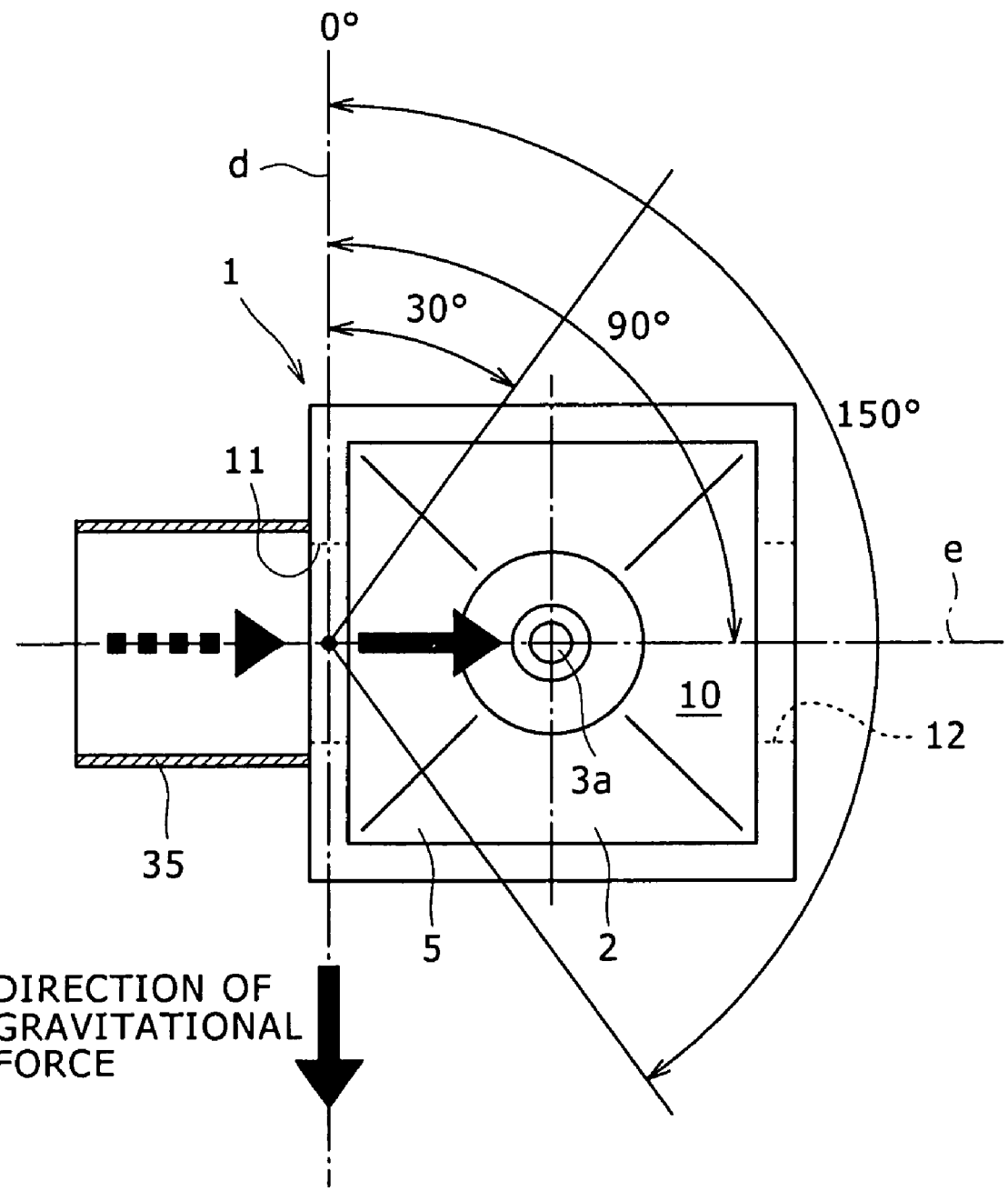
FIG. 7 is another diagram showing an entry angle at which a gas is introduced into an intralamp space.
Figure 8:
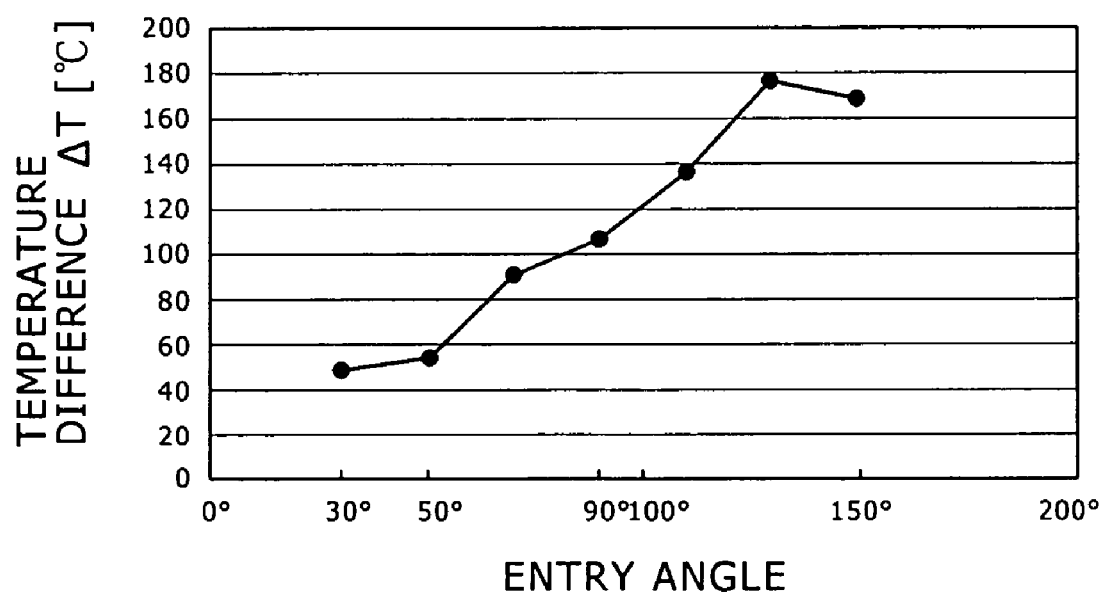
FIG. 8 is a graph showing the relationship between the entry angle and the temperature in FIG. 7.
Figure 9:
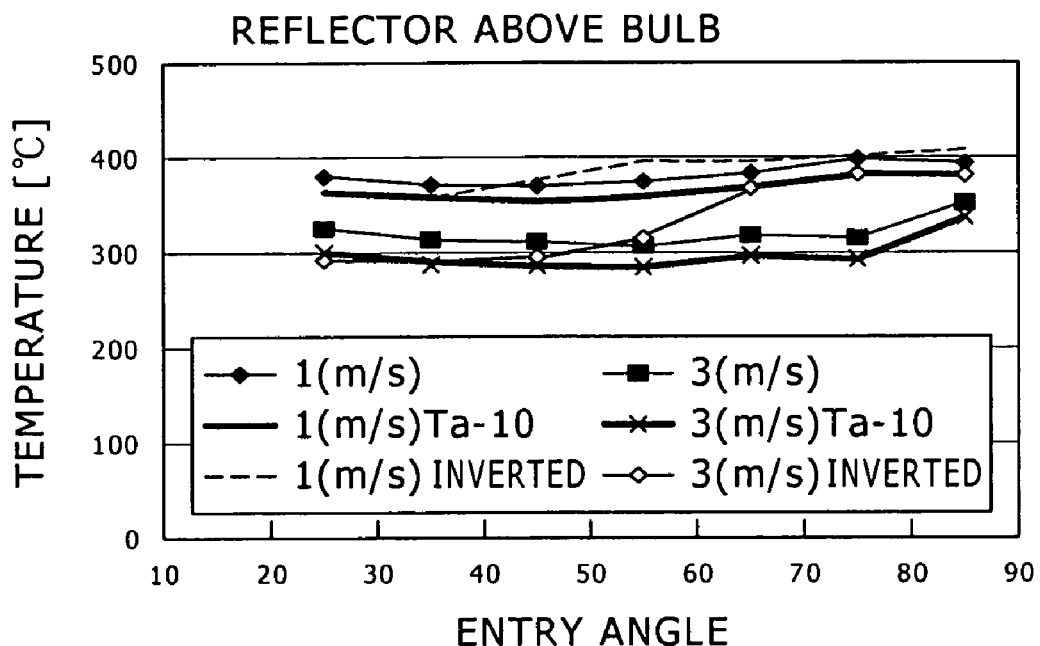
FIG. 9 is a graph showing the relationship between the entry angle and the temperature at a position above the reflector bulb.
Figure 10:
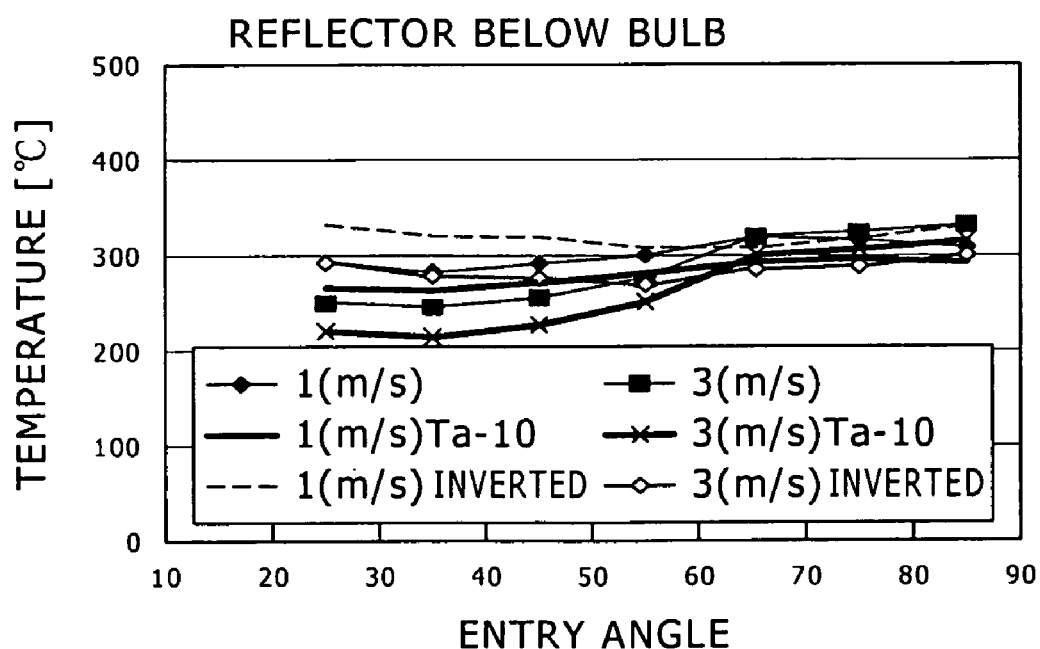
FIG. 10 is a graph showing the relationship between the entry angle and the temperature at a position below the reflector bulb.
Figure 11:
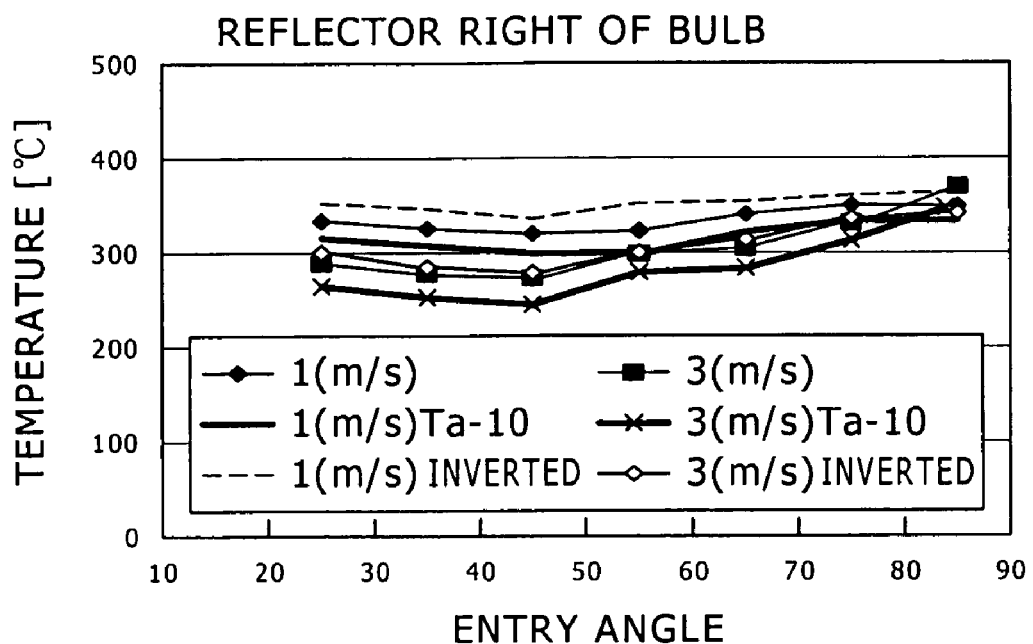
FIG. 11 is a graph showing the relationship between the entry angle and the temperature at a position right of the reflector bulb.
Figure 12:
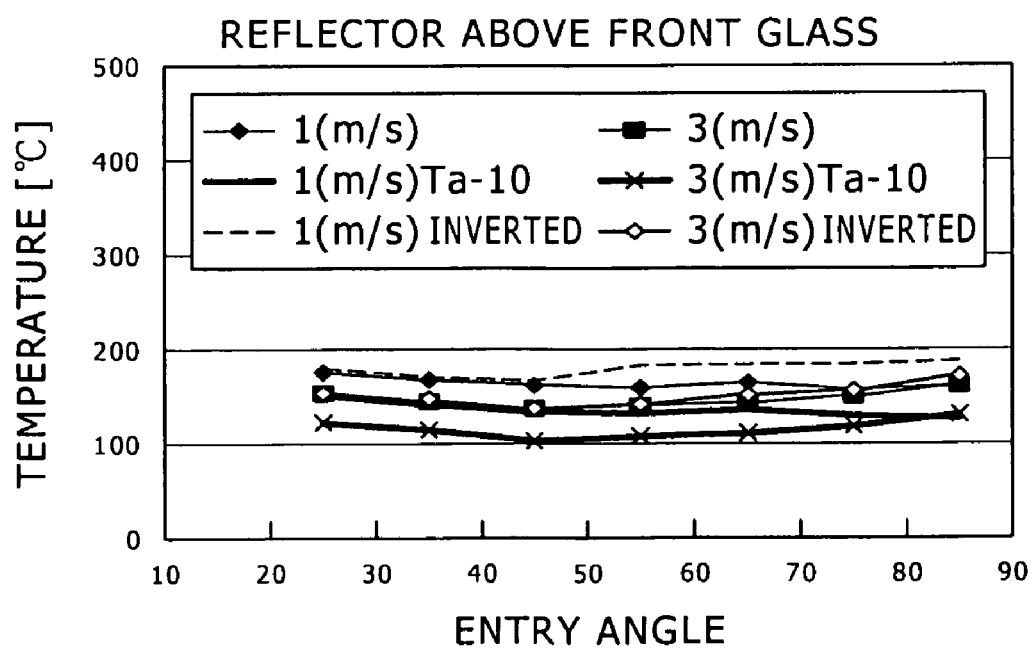
FIG. 12 is a graph showing the relationship between the entry angle and the temperature at a position above the front glass.
Figure 13:
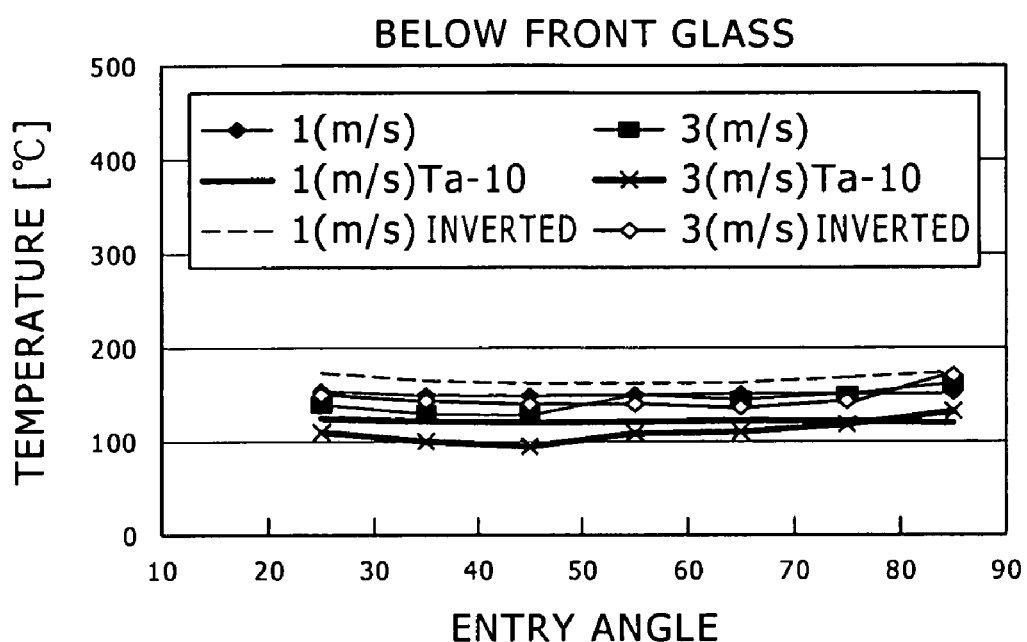
FIG. 13 is a graph showing the relationship between the entry angle and the temperature at a position below the front glass.
Figure 14:
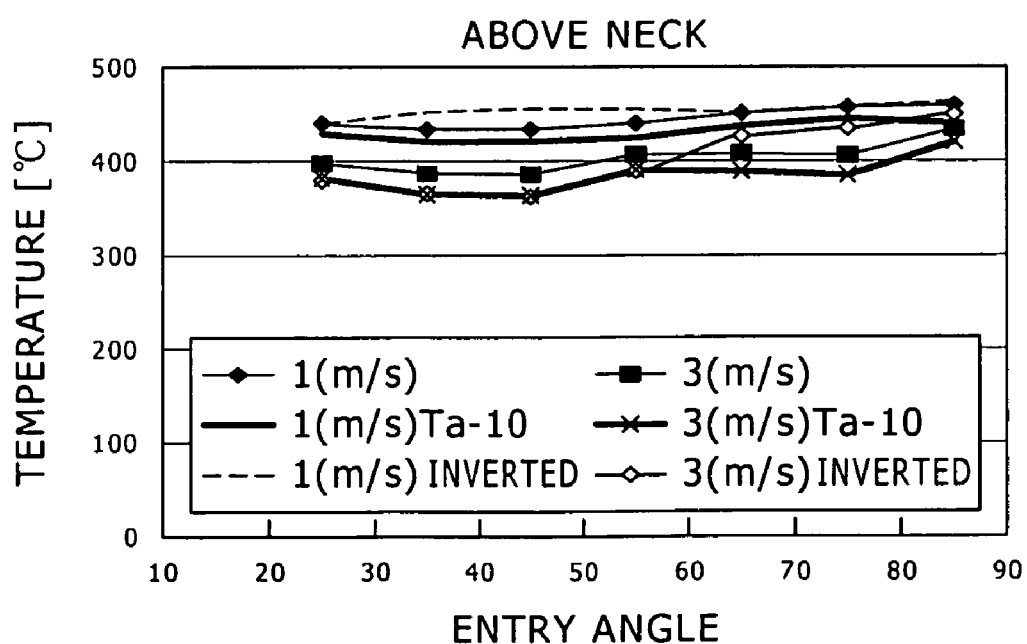
FIG. 14 is a graph showing the relationship between the entry angle and the temperature at a position above the neck.
Figure 15:
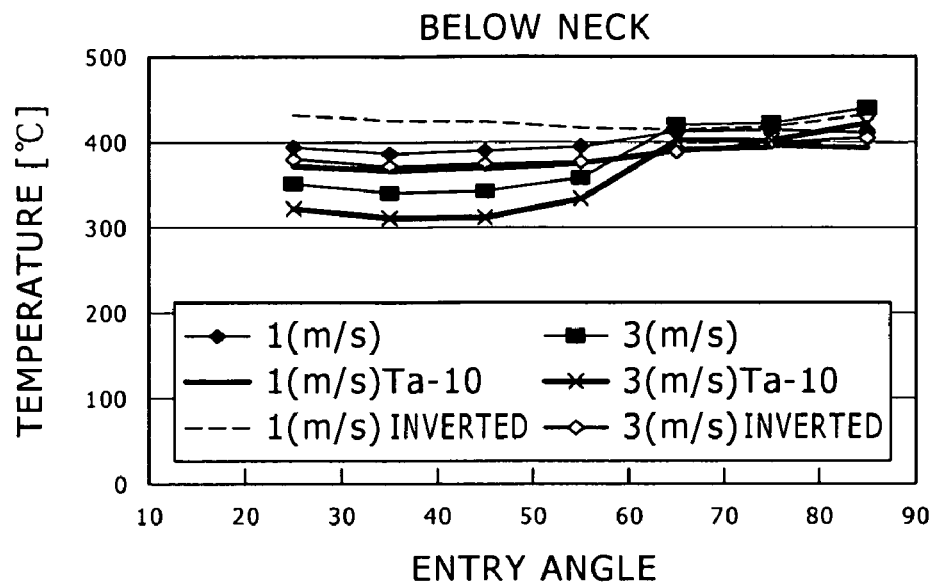
FIG. 15 is a graph showing the relationship between the entry angle and the temperature at a position below the neck.
Figure 16:
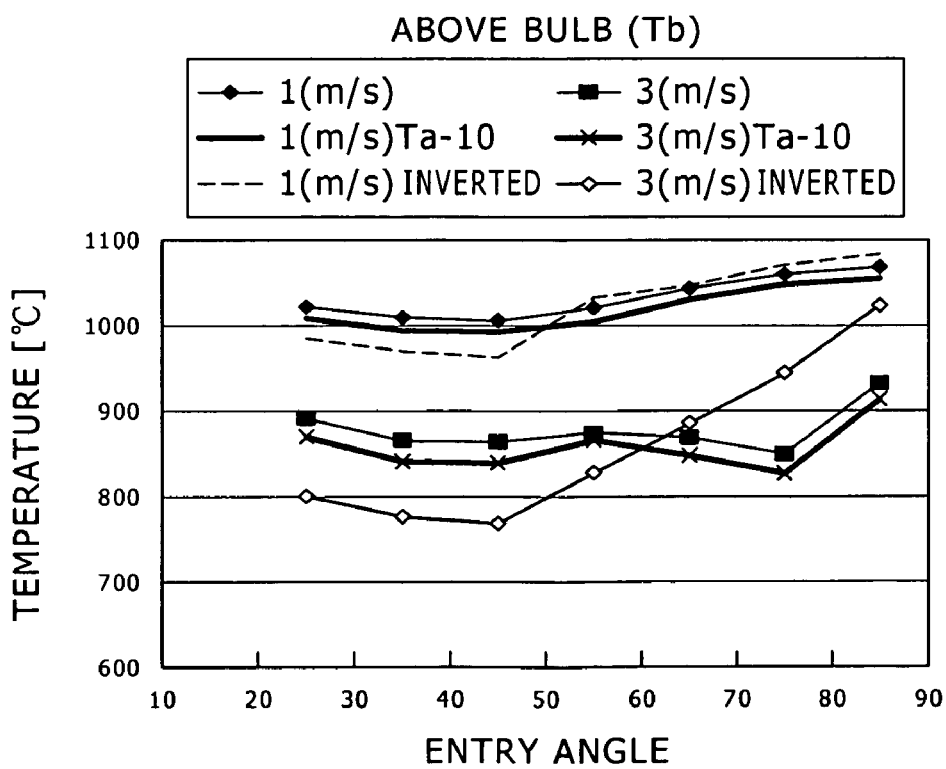
FIG. 16 is a graph showing the relationship between the entry angle and the temperature at a position above the bulb.
Figure 17:
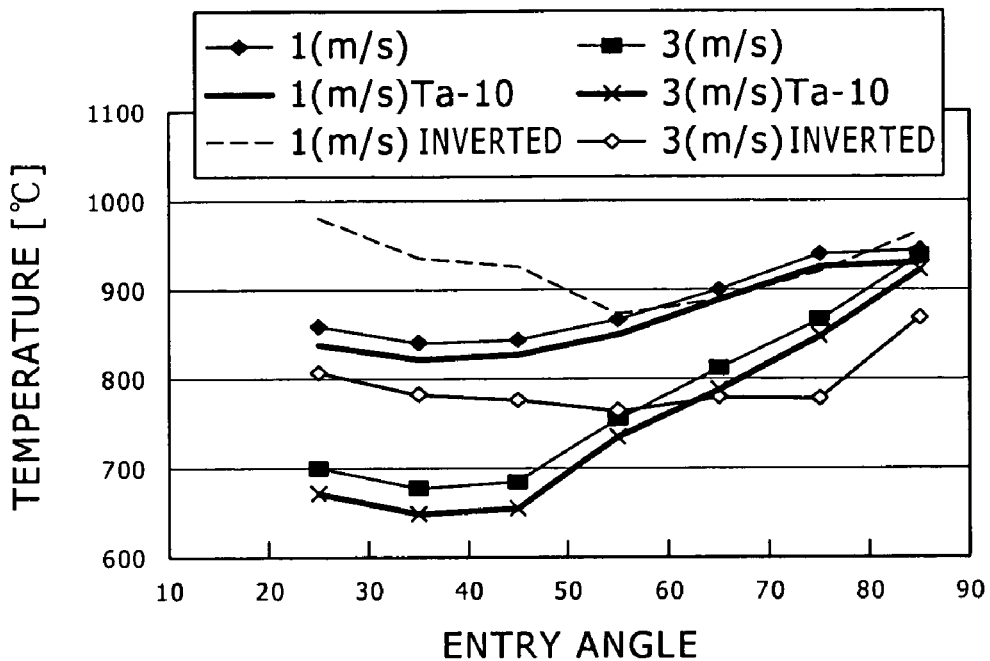
FIG. 17 is a graph showing the relationship between the entry angle and the temperature at a position below the bulb.

FIG. 7 shows the lamp 1 in front elevation, i.e., a side of the lamp 1 from which light is emitted. In FIG. 7, the gas inlet 11 is disposed on the left side of the lamp 1 and the gas outlet 12 on the right side of the lamp 1, and a straight line "e" interconnecting the center of the gas inlet 11 and the center of the gas outlet 12 lies perpendicularly to the gravitational direction. Table 1 shown below and FIG. 8 show temperatures of the light emission source 3a at the time the angle of entry of the gas from a duct 35b connected to the gas inlet 11 changed. In Table 1, T (Max) represents the maximum temperature of the light emission source 3a, T (Min) the minimum temperature of the light emission source 3a, and ΔT the difference T (Max)−T (Min). In the graph shown in FIG. 8, the vertical axis represents ΔT and the horizontal axis the clockwise angle θ from a straight line "d" extending through the center of the gas inlet 11 parallel to the gravitational direction.

TABLE 1

Temperature variations of the light emission source

| ENTRY ANGLE | T (Max) [° C.] | T (Min) [° C.] | ΔT [° C.] |
|---|---|---|---|
| 30° | 932 | 883 | 49 |
| 50° | 847 | 793 | 54 |
| 70° | 901 | 811 | 90 |
| 90° | 901 | 794 | 107 |
| 110° | 910 | 773 | 137 |
| 130° | 907 | 730 | 177 |
| 150° | 976 | 807 | 169 |

The results shown in Table 1 and FIG. 8 indicate that under the present conditions about the structure, shape, and gas speed, the temperature difference ΔT of the light emission source 3a is the smallest when the angle θ is about 50°, resulting in a cooling effect for highest lamp reliability. Practically, no problems arise under the given conditions if the entry angle falls in an angle range of 65° above the straight line "e" and an angle range of 65° below the straight line "e".

In each of the above embodiments, a structure for increasing an area of contact with the gas, e.g., dimples or fins, may be provided on the inner surface or the outer surface or both the inner and outer surfaces of the duct 18 for achieving a higher heat radiation efficiency of the duct 18.

A material having a high heat radiation rate, e.g., a ceramic coating, an alumite layer, a graphite layer, or the like, may be provided on the inner surface or the outer surface or both the inner and outer surfaces of the duct 18 for achieving a higher heat radiation efficiency.

The duct 18 may be made, wholly or partly, of a material having a vibration attenuating function, such as rubber, synthetic resin, or the like, for noise reduction.

The duct 18 may be of a structure doubling as the lamp case disposed around the lamp 1.

The lamp cooling device according to the present invention is not limited to being used for cooling the lamp of the projection display apparatus, but may be used to cool the lamps of various electronic apparatus or to cool lamps that are used alone.

Although certain preferred embodiments of the present invention have been shown and described in detail, it should be understood that various changes and modifications may be made therein without departing from the scope of the appended claims.

What is claimed is:

1. A lamp cooling device for cooling a lamp including a light emission source for emitting light, a front transparent plate, a reflector for reflecting light emitted by the light emission source toward the front transparent plate, the light emission source being disposed in an intralamp space surrounded by the front transparent plate and the reflector, said lamp cooling device comprising:
a duct having joint ports defined in respective opposite ends thereof and communicating with said intralamp space, said duct having a continuously extending portion between said opposite ends which is disposed in a space outside of said intralamp space, for circulating a gas through said duct and said intralamp space in isolated relation to the space outside of said intralamp space.

2. The lamp cooling device according to claim 1, further comprising:
an air blower disposed in said duct for forcibly circulating said gas through said duct.

3. The lamp cooling device according to claim 1, further comprising:
a cooling unit disposed in said duct for cooling the gas circulated through said duct.

4. The lamp cooling device according to claim 1, further comprising:
a pair of mesh plates disposed respectively in said joint ports of said duct.

5. The lamp cooling device according to claim 4, wherein each of said mesh plates extends perpendicularly to a direction in which said gas flows through said duct.

6. The lamp cooling device according to claim 1, further comprising:
a pair of structures disposed respectively near said joint ports of said duct, for controlling the direction of the gas flowing through said duct into and out of said intralamp space; and
a pair of mesh plates disposed respectively downstream and upstream of said joint ports.

7. The lamp cooling device according to claim 6, wherein each of said mesh plates extends perpendicularly to a direction in which said gas flows through said duct.

8. A projection display apparatus comprising:
a lamp including a light emission source for emitting light, a front transparent plate, a reflector for reflecting light emitted by the light emission source toward the front transparent plate, the light emission source being disposed in an intralamp space surrounded by the front transparent plate and the reflector, said lamp having a gas inlet and a gas outlet which communicate with said intralamp space; and
a lamp cooling device for cooling said lamp;
wherein said lamp cooling device including
a duct having joint ports defined in respective opposite ends thereof and communicating with said gas inlet and said gas outlet, respectively, said duct having a continuously extending portion between said opposite ends which is disposed in a space outside of said intralamp space, for circulating a gas through said duct and said intralamp space in isolated relation to the space outside of said intralamp space.

9. The projection display apparatus according to claim 8, wherein one of the opposite ends of said duct is connected to a region of said intralamp space which is made higher in temperature than other regions of said intralamp space by a natural convection of the gas in said intralamp space, and the other of the opposite ends of said duct is connected to a region of said intralamp space which is made lower in temperature than other regions of said intralamp space by the natural convection of the gas in said intralamp space.

10. The projector display apparatus according to claim 8, wherein said gas enters from said duct into said intralamp space in a direction which is inclined from a straight line interconnecting said gas inlet and said gas outlet toward said light emission source.

11. The projector display apparatus according to claim 8, wherein said gas enters from said duct into said intralamp space in an angle range of 45° from a straight line interconnecting said gas inlet and said gas outlet toward a direction in which light is emitted from said light emission source, and in an angle range of 25° from said straight line away from the direction in which light is emitted from said light emission source.

12. The projector display apparatus according to claim 8, wherein said gas inlet is defined in a side wall of said lamp, and said gas enters from said duct into said intralamp space in an angle range of 65° above a straight line interconnecting the center of said gas inlet and the center of said light emission source and in an angle range of 65° below said straight line.

13. The projector display apparatus according to claim 8, wherein said lamp and said duct are separably connected to each other by mating surfaces thereof with hermetic seals interposed therebetween.

* * * * *